United States Patent [19]

Beath et al.

[11] 4,449,615

[45] May 22, 1984

[54] HYDRAULIC RAM SAFETY DEVICE WITH CIRCULAR BRAKE

[75] Inventors: Robert W. Beath, Burbank; John R. McDonald, San Francisco, both of Calif.

[73] Assignee: McDonald Elevator, San Francisco, Calif.

[21] Appl. No.: 290,018

[22] Filed: Aug. 4, 1981

[51] Int. Cl.³ .................. B60S 13/00; F15B 15/26
[52] U.S. Cl. ..................... 188/67; 188/170; 187/8.49; 92/24; 92/27
[58] Field of Search ............ 188/31, 67, 84, 170, 188/186, 189, 216, 217; 91/41; 92/23, 24, 25, 26, 27, 28, 29; 187/8.45, 8.47, 8.49; 267/161, 162, 163; 74/531

[56] References Cited

U.S. PATENT DOCUMENTS

| | | | |
|---|---|---|---|
| 1,379,165 | 5/1921 | Burns et al. | 188/67 |
| 1,405,223 | 1/1922 | Kelley | 188/67 |
| 3,215,231 | 11/1965 | Lodige | 188/67 |
| 3,597,016 | 8/1971 | Gachot et al. | 188/67 |
| 3,635,315 | 1/1972 | Shalders | 188/189 |
| 3,706,361 | 12/1972 | Paulssen et al. | 188/189 |
| 3,783,976 | 1/1974 | Kerr | 187/8.47 |
| 3,783,983 | 1/1974 | McNally et al. | 188/189 |
| 3,995,534 | 12/1976 | Rastetter | 188/67 |
| 4,213,244 | 7/1980 | Bell et al. | 188/67 |

FOREIGN PATENT DOCUMENTS 304371  6/1971  U.S.S.R. ................. 188/67

*Primary Examiner*—Douglas C. Butler
*Assistant Examiner*—R. R. Diefendorf
*Attorney, Agent, or Firm*—Owen, Wickersham & Erickson

[57] ABSTRACT

A safety brake for hydraulic rams, particularly for hydraulic elevators, includes a plurality of braking members disposed around the piston in a circular array. The outer surfaces of the spaced apart braking members together form the shape of a truncated cone, and the inner surface of a stationary housing surrounding the brake members is complementarily shaped. The angle of inclination of the two conical surfaces is small, and the braking members move downwardly and inwardly only a short distance to engage the piston, so that the conical geometry of the brakes and housing surfaces does not produce significantly mismatched sliding surfaces as the brake members move downwardly.

7 Claims, 3 Drawing Figures

HYDRAULIC RAM SAFETY DEVICE WITH CIRCULAR BRAKE

BACKGROUND OF THE INVENTION

This invention relates to hydraulic ram safety apparatus, and more particularly to an improved hydraulic elevator safety brake having wedge-shaped braking members which are released in the event of a failure condition to wedge against and stop downward movement of the elevator's piston.

Hydraulic elevator safety devices of the type to which this invention relates are shown generally in U.S. Pat. Nos. 3,783,976, 3,783,983 and 3,995,534. All of these patents show hydraulic elevator safety brake systems having wedge-shaped braking members actuated to be released downwardly to wedge against the elevator's piston in response to a failure condition in the elevator.

U.S. Pat. No. 3,783,976 shows such braking members actuated in response to a drop in system pressure. U.S. Pat. No. 3,783,983 shows a device which functions somewhat similarly, but also including actuation of its wedge-shaped braking members in response to an overspeed condition of the elevator. U.S. Pat. No. 3,995,534 disclosed a brake system of the same general type, but wherein each of a series of wedge-shaped braking members around the piston was controlled directly by its own piston and cylinder positioned below the braking member. This differed from the other two patents, which utilized a lever connected to all the braking members and held in an disengaging position so long as no failure condition occurred, i.e. loss of system pressure or overspeeding. The lever was connected to an actuating hydraulic cylinder in communication with elevator system pressure, for holding the lever toward the disengaged position until a pressure drop occurred to permit the lever to move to the position of brake engagement.

The wedge-shaped braking members in each of these prior art systems were cylindrical at the inner face, for engagement against the elevator's piston, but the outer surfaces, which were positioned to slide along complementary surfaces in the supporting housing, were planar. In U.S. Pat. No. 3,783,976, for example, the two opposed braking members which appeared rectangular in plan view except for the half-circular cutout in each braking member for engaging the piston. In U.S. Pat. No. 3,995,534, three braking members were provided, forming generally the shape of a truncated cone at their exterior surfaces, and the surrounding housing was also circular, but the actual mating surfaces of the brake sections and the housing for travel of the brake sections down into the engaged position were planar. In fact, roller bearings were shown between the brake sections and the housing in that patent.

This latter construction required additional machining operations and a multiplicity of components and manufacturering steps, and would not be as economical to produce as the invention described below. In addition, three relatively small planar areas of the generally circular housing were expected to carry the very high wedging forces exerted outwardly when the full weight of the elevator car and piston was impacted to the braking members, pushing them downwardly. Unless the housing were of very great bulk and strength, this would tend to distort its shape.

None of the prior art elevator safety brake systems was as simple and economical to produce, while of very high strength to weight ratio, as is the present invention described below.

SUMMARY OF THE INVENTION

The hydraulic elevator safety brake system of the present invention utilizes a plurality of braking members disposed generally in a circular array about the elevator piston, forming together an outer surface generally in the shape of a truncated cone, without flats or bosses on those surfaces. The surrounding housing has an inner surface of complementary shape, so that the outer wedge surfaces slide directly down the housing surface to engage the inner sides of the wedge sections against the elevator's piston.

The geometry of the brake sections and the housing surface can match precisely only when the brake sections are at one level—as they move up or down, the relative geometry changes. Thus, a given point on the outer surface of a brake section encounters a smaller and smaller radius as it travels downwardly, although the radius of the brake section itself at that point remains constant. For this reason, it was never previously considered that the geometric configuration of the present invention would result in an operable safety brake.

However, in the present invention it was found that if the outer faces of the conical brake sections have a small inclination from vertical of about 4° to 8.5°, and preferably about 4°, with the total downward travel from the normal position to the engaged position of the brake members being kept to a minimum, preferably about one inch, the change in geometry during movement does not adversely affect the operability or efficiency of the system. Also, the surfaces of the brake sections and of the housing are configured to match when the brake sections are substantially at the engaged position, rather than the raised position, since this is the point at which support of the housing is most needed.

The safety brake system of the invention includes at least three and preferably more symmetrically placed and similarly sized brake sections. Since preferably only two actuating linkages are provided for raising and lowering the brake sections, the four sections must be connected together for movement in registry. This may be accomplished, according to the invention, by the provision of horizontal grooves in either the inner or outer faces of the brake sections, with a heavy spring wire extending through the grooves of all sections to hold them together at the same level. Additionally, these wires, when located at the inside surfaces of the brake wedges, adjacent to the elevator piston, may act as springs urging the brake sections outwardly toward their normal, raised position wherein they are spaced from one another. Each spring wire has a gap somewhere in its annulus, so it can act in the nature of a piston ring, to push outwardly on the brake sections.

As in U.S. Pat. No. 3,783,976, the actuating linkage of the system of the invention includes a pair of pins, each extending outwardly from one of the brake wedges and through a vertically elongated slot in the surrounding housing. However, unlike the systems of the prior art, spring pressure is applied to the pins directly at the location of the pins, rather than at the end of a lever. Vertical connection links depend from the pins, and a compression spring on each link urges the link and the pin downwardly with respect to the housing.

A lever is connected to each of the pins or pin linkages, with a fulcrum at one end of the lever and an actuating hydraulic cylinder at the other. This cylinder acts as in U.S. Pat. No. 3,783,976, to hold the lever and the brake in the raised position, out of engagement from the piston against the force of the springs, except when a failure condition releases pressure in the cylinder to allow the lever and the brake members to move downwardly.

hydraulic piston or ram wherein a safety stopping feature is desirable, although it is principally described herein with respect to elevators.

It is therefore among the objects of the invention to provide a simple and inexpensive hydraulic ram safety brake system, one with more efficient geometry and design than those of the prior art. These and other objects, advantages and features of the invention will be apparent from the following description of a preferred embodiment considered in connection with the appended drawings.

DESCRIPTION OF A PREFERRED EMBODIMENT

Figure 1:
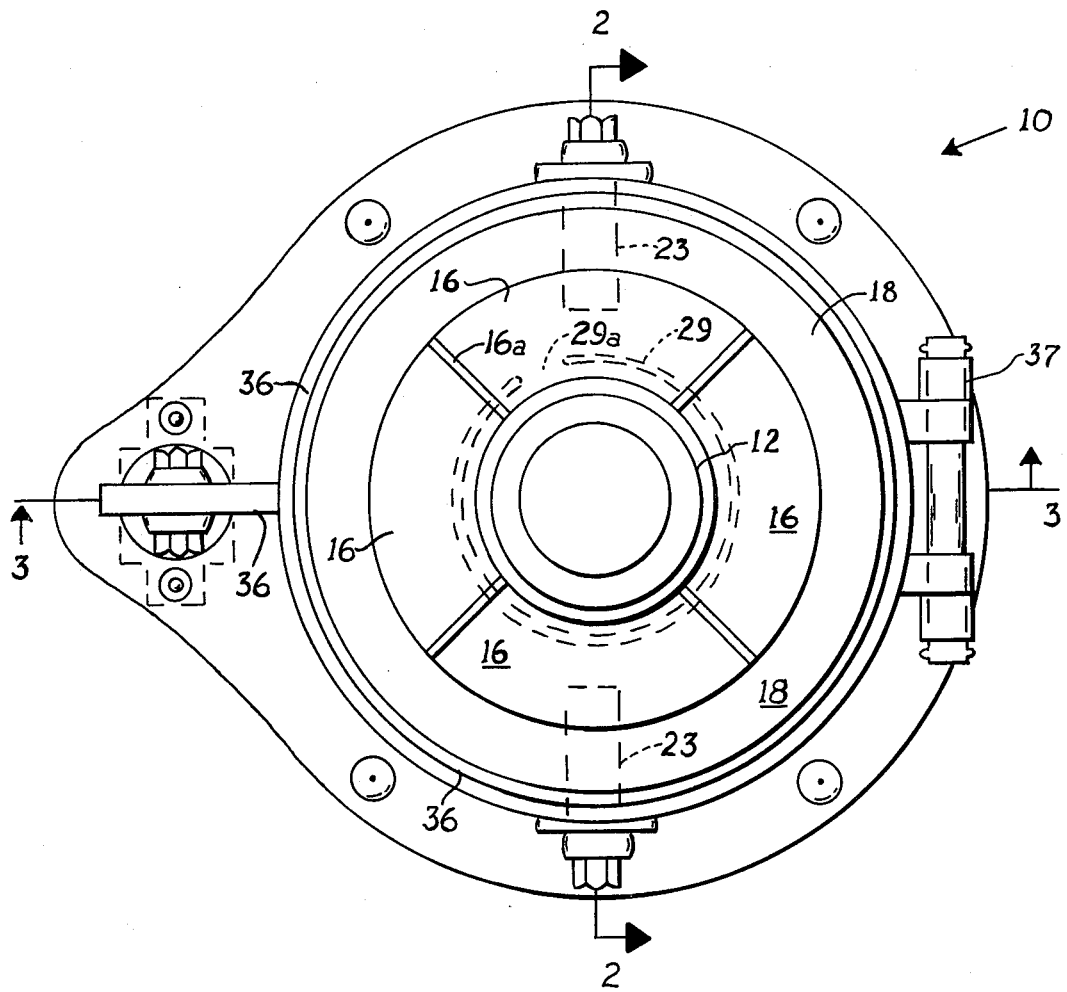
FIG. 1 is a plan view, partially in section, showing a hydraulic elevator safety brake system according to the invention.

The drawings show a safety brake system according to the invention, indicated generally by the reference numeral 10. Although the brake system 10 is applicable to many hydraulic ram or piston devices, it is shown here in its preferred use on for a hydraulic elevator. References to "up", "down", "vertical", etc. should be understood to refer generally to the realtive positions of components of the illustrated device, which could be oriented otherwise than as illustrated, for non-elevator applications. The elevator, indicated at 11 in FIG. 2, has a vertically reciprocable piston 12 about which the safety brake apparatus 10 is positioned. The apparatus 10 is secured to fixed structure in the elevator shaft by structural anchoring supports 14.

Figure 2:
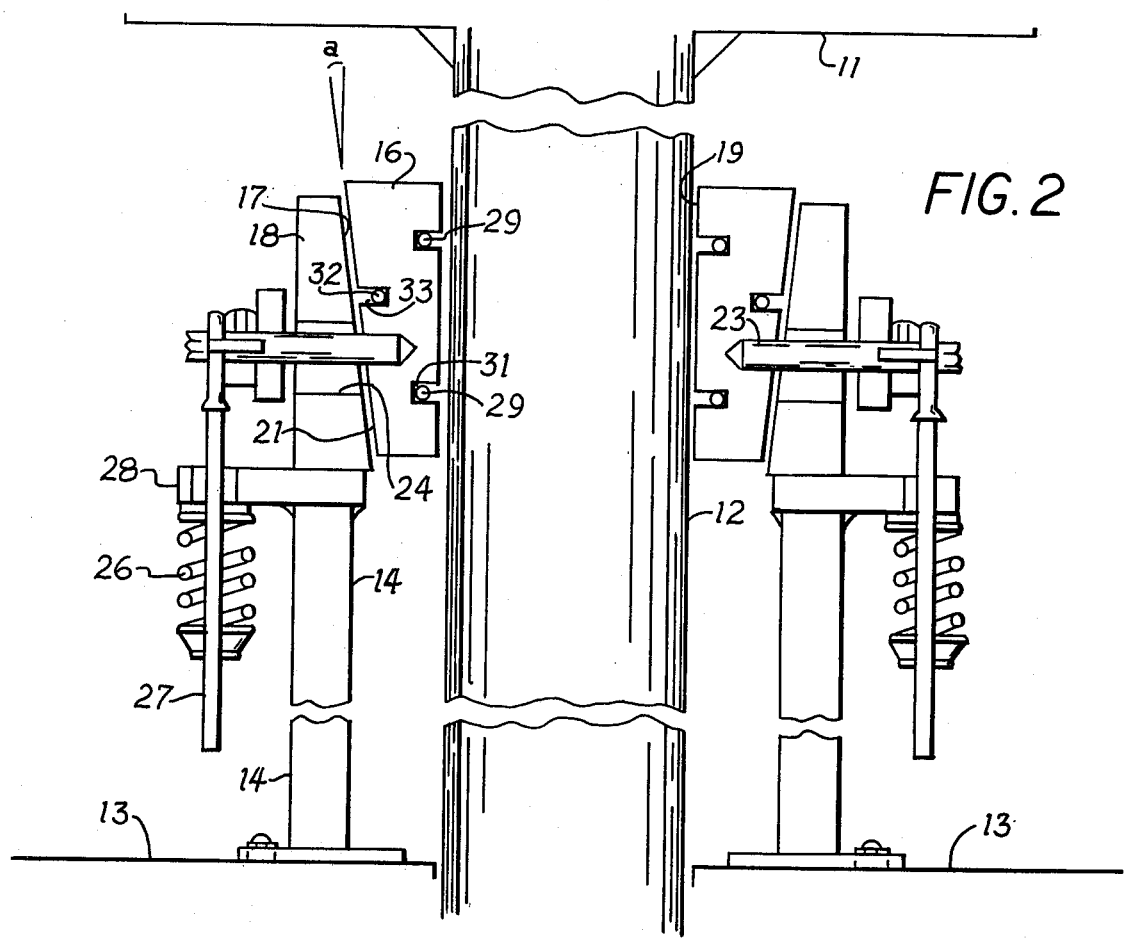
FIG. 2 is a sectional view in elevation of the elevator safety apparatus, as viewed along the line 2—2 in FIG. 1.

As best seen in FIGS. 1 and 2, the safety device 10 includes a plurality of wedge-shaped braking members or sections 16 which co-act with complementary wedging surfaces 17 at the inside of a surrounding annular housing 18 to move inner, cylindrical braking surfaces 19 of the sections or wedges 16 against the cylindrical piston 12 in the event of a failure condition. In the prior art, the complementary wedging surfaces of the brakes and housing were always planar, as explained above. In the present invention, the tapered housing surface 17 and the cooperating tapered surface 21 of the braking members 16 are in the shape of truncated cones. At least three and preferably more braking members 16 are included. Four braking members are shown in the plan view of FIG. 1.

As discussed above, the ability of the conical geometry of the exteriors of the braking sections 16 to match precisely that of the housing surface 17 is severly limited. The braking members meet smaller and smaller radii in the conical housing as they move downwardly, so that the geometry of each brake member's exterior surface can be made to actually match that of the housing at only one level. The brake shoes are segmented into sections 16, with gaps 16a sufficiently wide between them so that downward travel is not limmited by convergence of the shoes alone. Preferably, the level at which the surfaces match is substantially the level at which the brake wedges 16 have moved into engagement with the elevator piston 12, since this is the condition in which the force of the wedging braking action is exerted against the housing and at which the full surface contact support of the ring-shaped housing 8 is needed.

The prior art did not contemplate the use of complementary coneshaped wedge and housing surfaces, probably because this might seem impractical and inefficient, if not inoperable, due to the changing geometry of the surfaces as they move vertically relative to each other. In the present invention, this potential problem is avoided by use of a small angle a of the conical wedging surface with respect to the vertical, and a relatively small total vertical travel of the braking members 16 from their raised position shown in the drawings to the lowered, inward position of engagement with the piston 12. Also, the matching of the complementary surfaces at the point of piston engagement helps make the design efficient, as explained above.

In a preferred embodiment, the angle a is about 4° to 8.5°, and preferably about 4°. The total vertical travel of the brake wedges 16 may be on the order of about one inch, for an averaged-sized elevator piston.

The circular housing is inexpensively produced and can withstand very great wedging braking forces without heavy structure due to its configuration. Similarly, the braking members 16 themselves can be produced economically. Aluminum is economical and has been found to work effectively, although other materials may suffice.

Figure 3:
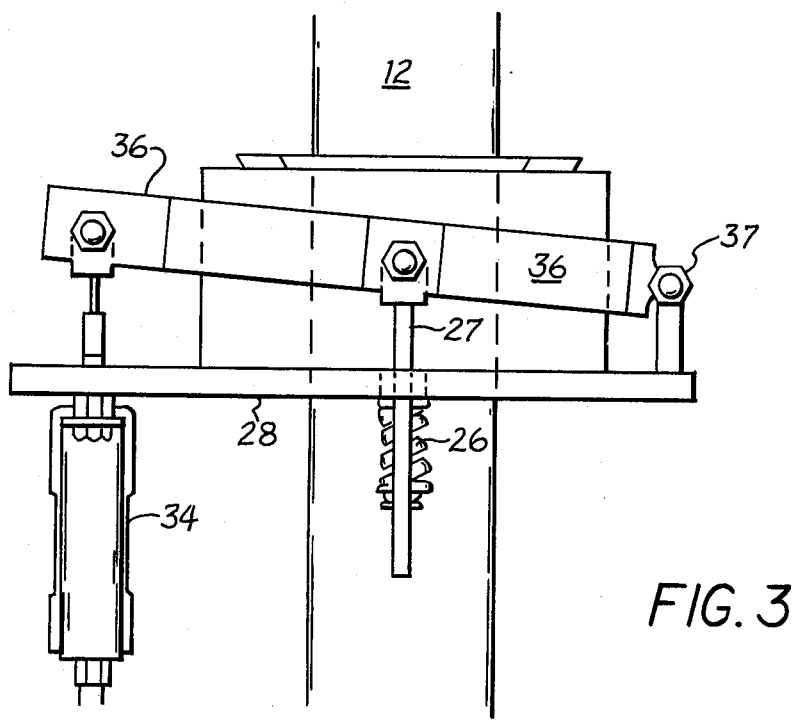
FIG. 3 is a side elevational view of the elevator brake system, as viewed along the line 3—3 in FIG. 1.

As in U.S. Pat. No. 3,783,976, the braking members 16 are actuated for up and down movement by a pair of actuating pins 23 which extend radially to a connection with the members 16 through vertically elongated openings 24 in the immediately adjacent housing 18. These pins 23 are urged downwardly to urge the braking members 16 toward engagement, preferably by springs such as the compression springs 26 shown in FIGS. 2 and 3. The springs 26 illustrated in the drawings are positioned to push downwardly on linkage members 27 connected to the pins 23 as shown, while engaging against a fixed component such as a base plate 28 of the base structure.

There are only two actuating pins 23 in this preferred embodiment, and only two of the four braking members 16 are engaged by them. To hold all the braking members in registry, they must be keyed together in a way which will permit them to converge together when moving downward and to spread apart when being raised to the disengaged position. In this embodiment they are held together by heavy wires or rods 29 extending annularly through grooves 31 in the inner surfaces 19 of all the braking members 16. These wires 29 each have a gap 29a (FIG. 1) and can also act as springs lightly urging the brake members 16 outwardly, so that the members 16 move outward from the piston 12 and spread apart from each other when raised. Optionally, an additional wire or rod 32 similar to the wires 29 may be positioned in grooves 33 in the outer, conical surface 21 of the brake members 16, also for keeping the members 16 in registry, although the inner wires 29 exert the greater total force.

Control of the position of the braking members 16 preferably is by a hydraulic cylinder 34 (FIG. 3), as in U.S. Pat. No. 3,783,976, connected to a lever 36 which connects to the actuating pins 23. The lever 36, which may be generally circular as shown particularly in FIG. 1, is connected to fixed structure such as the base plate 28 by a hinge 37, its pivoting movement being controlled by fluid pressure or lack thereof in the actuating cylinder 34. The cylinder 34 in turn is connected to elevator system hydraulic pressure, and it may also be connected to a dump valve operative to dump the cylinder's pressure in the event of an overspeed condition.

Downward pressure, biasing the brake toward engagement, is applied by the coil springs 26 directly at the location of the two actuating pins 23, so that the spring pressure is simple, direct and fail safe, without the need for any mechanical advantage as, for example, in U.S. Pat. No. 3,783,983.

In operation of the elevator safety brake 10, the wedge brake members 16 are normally held up in the raised position shown, by fluid pressure in the cylinder 34. This holds the lever 36 in the raised position, and along with it the actuating pins 23 and the braking members 16, all against the force of the springs 26, as well as the weight of these components themselves.

If a system failure occurs, the lever 36 is allowed to fall, either through pressure drop or dumping of the pressure in the cylinder 34 or through some other means of freeing the lever to drop. Immediately, the brake wedges 16 drop, contact the elevator piston 12 and are pulled downwardly by that contact, wedging them more tightly between the piston 12 and the housing's tapered surface 17. This applies a very large braking force to the piston due to the relatively small angle of the wedging surfaces and the consequent increasing wedging pressure with greater downward force and speed.

The elevator piston is locked within a very short time, with no scoring or distortion by the large braking force because of the even distribution of force angularly around the circumference of the piston. The arrangement of the braking members in the present invention, including at least three of them acting at equal spacing, improves on several prior art systems which had only two brake members. Those systems tended to apply more force in the direction the planar brake shoes acted, thus applying force more locally, whereas the present conical configuration applies force very evenly around a circle.

When the safety brake apparatus 10 is to be reset, upward movement of the elevator piston 12 frees the wedge member 16, and the lever 36 is raised and again set in the raised position.

The preferred embodiment described herein is intended to be purely illustrative, and not limiting of the scope of the invention. Other embodiments and variations will be apparent to those skilled in the art and may be made without departing from the essence and scope of the invention as defined in the following claims.

We claim:

1. A hydraulic ram safety brake of the type including braking members adapted to engage the ram or piston to stop movement of the piston when the braking members are released in the direction of piston travel in a failure condition, comprising:

a housing surrounding a portion of the piston and fixedly mounted with respect to fixed structure adjacent to the piston, the housing having a tapered innner surface generally in the shape of a truncated cone;

a plurality of brake sections positioned in a circular array between the housing and the piston, the brake sections together forming an outer surface in the general shape of a truncated cone, generally matching the inner surface of the housing and being engaged against it;

at least one recess in a face of each brake section, the recesses being aligned in a circular array, and a holding wire in a generally circular configuration extending through each recess to hold the brake sections in registry;

said brake sections being spaced apart when the safety brake is in the normal, inoperative position with the brake sections spaced away from the engaged position and outwardly from the piston;

means for holding the brake sections in the inoperative pistion under normal operating conditions;

means urging the brake sections, together, toward the position of engagement with the piston, and means for releasing the holding means under a failure condition.

2. A hydraulic ram safety brake of the type including braking members adapted to engage the ram or piston to stop movement of the piston when the braking members are released in the direction of piston travel in a failure condition, comprising:

a housing surrounding a portion of the piston and fixedly mounted with respect to fixed structure adjacent to the piston, the housing having a tapered innner surface generally in the shape of a truncated cone;

a plurality of brake sections positioned in a circular array between the housing and the piston, the brake sections together forming an outer surface in the general shape of a truncated cone, generally matching the inner surface of the housing and being engaged against it;

a pair of pins extending laterally into two of the brake sections from outside the housing, passing through elongated openings in the housing to permit translating movement of the pins and brake sections;

said brake sections being spaced apart when the safety brake is in the normal, inoperative position with the brake sections spaced away from the engaged position and outwardly from the piston;

means for holding the brake sections in the inoperative position under normal operating conditions;

spring means engaging each pin outside the housing, for urging the pin toward the engaged direction and for urging the brake sections, together, toward the position of engagement with the piston; and means for releasing the holding means under a failure condition.

3. A hydraulic safety brake according to claim 2, wherein the spring means comprises a linkage member extending from each pin and a compression spring connected to the linkage member and the housing and disposed to pull on the linkage member, toward the engaged direction.

4. A hydraulic safety brake according to claim 2, wherein at least three brake sections are included and including means retaining the brake sections in registry.

5. A hydraulic safety brake according to claim 4, wherein the retaining means comprises at least one recess in a face of each brake section, the recesses being aligned in a circular array, and a holding wire in a gen- 6. A hydraulic safety brake according to claim 5, wherein the recess is at the inner side of the brake sections, and the holding wire has a gap and is so positioned to exert a force outwardly on the brake section to urge them apart.

7. A hydraulic ram safety brake of the type including braking members adapted to engage the ram or piston to stop movement of the piston when the braking members are released in the direction of piston travel in a failure condition, comprising:

a housing surrounding a portion of the piston and fixedly mounted with respect to fixed structure adjacent to the piston, the housing having a tapered inner surface generally in the shape of a truncated cone;

a plurality of brake sections positioned around the piston, between the housing and the piston, the brake sections having inclined outer surfaces engaged against the inner surface of the housing in wedging relationship between the housing and the piston;

a pair of pins extending laterally into two of the brake sections from outside the housing, passing through elongated openings in the housing to permit translating movement of the pins and brake sections;

said brake sections being spaced apart when the safety brake is in the normal, inoperative position with the brake sections spaced away from the engaged position and outwardly from the piston;

means for holding the brake sections in the inoperative position under normal operating conditions;

spring means engaging each pin outside the housing, for urging the pin toward the engaged direction and for urging the brake sections, together, toward the position of engagement with the piston; and means for releasing the holding means under a failure condition.

* * * * *